(12) United States Patent
Heuze et al.

(10) Patent No.: US 6,505,660 B2
(45) Date of Patent: Jan. 14, 2003

(54) RUNFLAT DEVICE FOR A MOTOR VEHICLE INCLUDING A RING MADE OF AT LEAST TWO SECTORS INDEPENDENT OF EACH OTHER

(75) Inventors: Olivier Heuze, L'Isle Adam (FR); Eric Michelot, Cergy (FR); Bruno Pelletier, Persan (FR)

(73) Assignee: Hutchinson, Paris (FR)

( * ) Notice: Subject to any disclaimer, the term of this patent is extended or adjusted under 35 U.S.C. 154(b) by 13 days.

(21) Appl. No.: 09/849,902

(22) Filed: May 4, 2001

(65) Prior Publication Data

US 2001/0052379 A1 Dec. 20, 2001

(30) Foreign Application Priority Data

May 11, 2000 (FR) .............................. 00 05998

(51) Int. Cl.⁷ .............................................. B60C 17/04
(52) U.S. Cl. ...................................... 152/158; 152/520
(58) Field of Search ................................. 152/158, 520

(56) References Cited

U.S. PATENT DOCUMENTS

| 2,986,189 A | * | 5/1961 | Lindley ...................... 152/158 |
|---|---|---|---|
| 3,141,490 A | * | 7/1964 | Lindley ...................... 152/158 |
| 3,142,326 A | * | 7/1964 | Lindley ...................... 152/158 |
| 3,451,457 A | * | 6/1969 | Leyer ......................... 152/158 |
| 4,270,592 A | | 6/1981 | Patecell |
| 4,572,260 A | * | 2/1986 | Ordu ..................... 152/520 X |
| 4,922,981 A | | 5/1990 | Pompier |
| 5,626,696 A | | 5/1997 | Boni et al. |

FOREIGN PATENT DOCUMENTS

| DE | 1176013 | 8/1964 | |
|---|---|---|---|
| FR | 796666 | 4/1936 | |
| FR | 2256847 | 8/1975 | |
| FR | 2622149 | 4/1989 | |
| JP | 3-231007 A | 10/1991 | |
| JP | 03231007 A | * 10/1991 | ................. 152/520 |

* cited by examiner

Primary Examiner—Adrienne C. Johnstone
(74) Attorney, Agent, or Firm—Alston & Bird LLP

(57) ABSTRACT

The invention provides a runflat device for a motor vehicle, the device comprising a ring for mounting inside a tire on a one-piece non-standard wheel rim that presents a drop center, an inner flange and an outer flange, said ring being made as at least two sectors each having a radially inner zone and a radially outer zone, wherein the sectors of the ring are independent of one another, and wherein each sector is fixed to the rim via its radially inner zone.

14 Claims, 2 Drawing Sheets

RUNFLAT DEVICE FOR A MOTOR VEHICLE INCLUDING A RING MADE OF AT LEAST TWO SECTORS INDEPENDENT OF EACH OTHER

The invention relates to a runflat device for a motor vehicle, enabling a considerable distance to be traveled at relatively high speed with a tuneless tire that is partially or totally deflated.

BACKGROUND OF THE INVENTION

In general, for fitting to civilian vehicles, runflat devices need to be suitable for being mounted on standard wheel rims, which means one-piece rims of the drop-center type.

Presently-known runflat devices are generally constituted by a rolling ring which is clamped around the rim of the wheel inside the tire. The ring is constituted either by a single, relatively flexible piece from which a splice has been removed, or else by at least two rigid pieces in the form of circular arcs or sectors. To mount the ring in a clamped configuration around the rim, it is necessary to provide assembly and clamping fastener means between the two free ends of the split ring or between the facing ends of the ring sectors. Assembly and clamping fastener means are rigid and they are constituted by mechanical elements such as nuts-and-bolts, for example.

Unfortunately, experience shows that it is such rigid fastener means that constitute the weak links in runflat devices (e.g. Due to fatigue phenomena). Furthermore, mounting a runflat device is an operation that requires the operator to be trained, in particular because of the small amount of space available for the tool that is required for clamping the ring onto the rim.

According to document FR-97/13618 in the name of the Applicant, the runflat device is made up in such a manner as to eliminate assembly and clamping fastener means. It comprises at least one open inner ring of relatively rigid material for mounting on the rim, and a continuous outer ring that is substantially in extensible and that is engaged on the inner ring so as to clamp it and fix it to the rim.

In an improvement disclosed in document FR-98/04225, likewise in the name of the Applicant, the ring is made up of three pieces, namely: two first annular pieces that are open at respective slices and that are designed to be mounted one on the other around the rim, and a third annular piece that is continuous and coaxial about the two preceding pieces, said third piece serving to clamp the system built up in this way onto the rim.

OBJECTS AND SUMMARY OF THE INVENTION

An object of the invention is specifically to avoid problems associated with assembly and clamping fastener means between the two free ends of a ring or between sectors of a ring.

To this end, the invention provides a runflat device for a motor vehicle, the device comprising a ring for mounting inside a tire on a one-piece non-standard wheel rim that presents a drop center, an inner flange and an outer flange, said ring being made as at least two sectors each having a radially inner zone and a radially outer zone, wherein the sectors of the ring are independent of one another, and wherein each sector is fixed to the rim via its radially inner zone.

In general, the radially inner zone of each sector of the ring is terminated by a circularly actuate footing designed to bear against the bottom of the drop center, and said footing presents an inner lateral flange and an outer lateral flange, the inner flange being received in a lateral groove in the drop center while the outer flange matches the profile of the drop center and cooperates with the means for fixing the sector of the ring on the rim.

In the invention, each sector of the ring is secured to the wheel rim by means of screws or by means of a clamping belt.

In a first embodiment of the invention, fixing screws are used which pass through the outer flange of the footing of each sector of the ring and penetrate into tapped blind holes formed in the thickness of the wheel rim from the bottom of the drop center.

Advantageously, the tapped blind holes are machined obliquely in the thickness of the rim to facilitate screw-fitting operations.

In a second embodiment of the invention, fixing screws are used which pass through tapped holes machined laterally through the rim and opening out into the drop center so as to bear in clamped manner against the outside faces of the sectors of the ring.

In addition, the inner flanges of the footings of the sectors of the ring bear against an O-ring placed in the lateral groove of the drop center and designed to accommodate the lateral tolerances of the various parts of the assembly, while each fixing screw has an enlarged head which bears against the rim via a sealing ring.

In a third embodiment of the invention, the means for fixing the sectors of the ring on the rim are constituted by a clamping belt which surrounds the outer flanges of the sectors of the ring.

BRIEF DESCRIPTION OF THE DRAWINGS

Other advantages, characteristics, and details of the invention appear from the additional description below made with reference to the accompanying drawings given purely by way of example and in which.

MORE DETAILED DESCRIPTION

Figure 1:
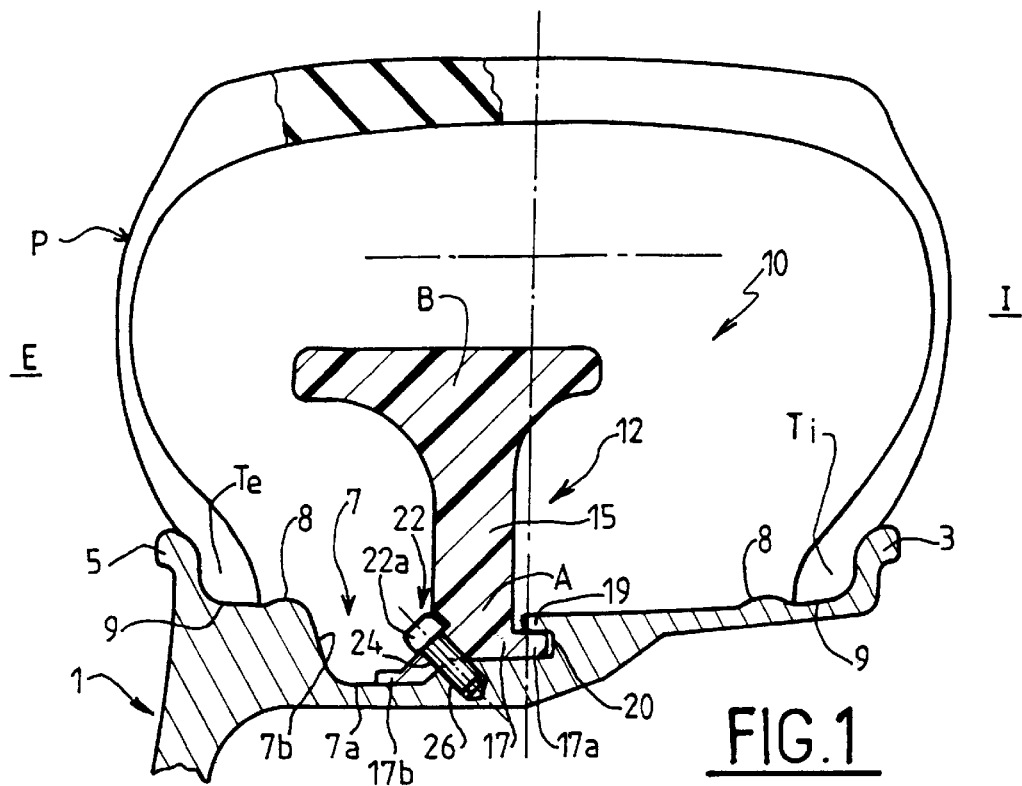
FIG. 1 is a half-view in axial section of a first embodiment of a runflat device of the invention.

Reference is made initially to FIG. 1 for a brief description of a non-standard wheel rim 1 for a motor vehicle and on which a runflat device of the invention is to be mounted.

The rim 1 is a one-piece or integrally-formed annular part presenting in particular and in conventional manner:

two rim flanges, namely an inner peripheral flange 3 and an outer peripheral flange 5;

a central drop center 7; and two peripheral humps 8 respectively adjacent to each of the two peripheral flanges 3 and 5 to form two wells 9 for receiving the two beads $T_i$ and $T_e$ of the tire P.

In the text below, the adjectives "inner" and "outer" are used with reference to the inner side I and the outer side E of the rim 1 or the tire P.

In general, the runflat device 10 of the invention is constituted by a rigid ring 12 which is split into at least two circularly actuate elements or sectors 15. The sectors 15 of the ring 12 are independent of each other and they are fitted separately around the rim 1 without any linking fasteners for assembling together the two sectors. Advantageously, the ring 12 is made as a single part and is then split into a plurality of sectors using a cutting tool, e.g. Aa saw, so as to minimize the clearance that exists between the sectors once they have been fitted around the rim.

The number of sectors 15 of the ring 12 can vary, in particular as a function of the relative dimensions of the ring 12 relative to those of the tire P. The ring 12 can be made of aluminum, but it is preferably made of a plastics material of the polyamide type, possibly filled with glass fibers for example in order to reinforce its mechanical strength and its ability to withstand high temperatures. Each sector 15 of the ring 12 can have a tread-forming coating of flexible rubber on its outer periphery, in particular when the sectors 15 are made of aluminum.

Each sector 15 of the ring 12 has a central portion or beam, a radially inner zone A and a radially outer zone B whose periphery forms the runflat surface on which the tread of the tire P comes to bear and which forms an outwardly-directed projection so as to prevent the tire P from moving sideways. The drop center 7 is a cavity defined by a bottom 7a, an outer side wall 7b, and an inner side wall which presents a peripheral tongue 19 serving to co-operate with the bottom 7a of the drop center 7 to define a lateral groove 20. The radially inner zone A of each sector 15 is terminated by a circularly actuate footing 17 which comprises an inner lateral flange 17a and an outer lateral flange 17b extending on opposite sides of the central portion of the sector 15. The width of this footing 17, including the width of its lateral flanges 17a and 17b, is considerably smaller than the width of the drop center 7 for reasons associated with mounting the tire P on the rim 1, as explained below.

During assembly, the tire P is partially mounted around the rim 1 so as to position the inner bead $T_i$ of the tire P immediately after the drop center 7 while leaving its outer bead $T_e$ outside the rim 1 so as to leave room to insert the sectors 15 into the inside of the tire P. Each sector 15 is put into place on the rim 1 by inserting its footing 17 in the drop center 7, and then pushing laterally so that the inner lateral flange 17a of its footing 17 penetrates into the lateral groove 20 in the drop center 7.

Thereafter, a lubricant gel is applied to the inner profile of the tread of the tire P so as to reduce friction against the periphery of the ring 12 when running on a flat.

Thereafter, the outer bead $T_e$ of the tire P is mounted on the ring 1, and this is possible because the footing 17 of the sectors 15 occupies only a portion of the volume of the cavity formed by the drop center 7 so as to leave enough room to mount the outer bead $T_e$. If the footing 17 occupied all of the drop center 7, then it would not be possible to mount the outer bead $T_e$ of the tire.

The two semi cylindrical sectors 15 are secured by means of six screws 22, for example. Each screw 22 is engaged in a hole 24 that passes through the outer lateral flange 17b of a sector 15 to penetrate into a corresponding blind hole 26 in the rim 1, and it is tightened until the head of the screw 22a comes to bear against the footing 17. For this purpose, the outer bead $T_e$ of the tire P is moved away so as to uncover each of the holes 24 and 26 one after another so as to leave enough room to enable an operator to fix the sectors 15 of the ring 12 on the rim 1. In general, the holes 24 and 26 are pierced so as to be somewhat inclined, making it easier to install the screws 22. Advantageously, a system for centering the sectors 15 is used so as to ensure that the holes 24 passing through the outer flanges 17b are properly placed in register with the blind holes 26 in the rim 1.

Finally, the tire P is inflated so that both of its beads $T_i$ and $T_e$ take up their positions in the respective wells 9 of the rim 1 and become wedged therein due to the pressure acting on the flanges 3 and 5 of the rim.

Thus, the sectors 15 of the ring 12 are locked in position both laterally and vertically. Lateral locking is provided by means of the fixing screws 22 and vertical locking is provided by means of the screws 22 and also by means of the lateral groove 20 in the drop center 7.

It is important to observe that once the sectors 15 have been fixed to the rim 1:

the inner lateral flange 17a of each footing 17 of a sector 15 does not come into contact with the bottom of the lateral groove 20 in the drop center 7; and the tongue 19 of the rim 1 which defines the lateral groove 20 of the drop center 7 does not come into contact with the sectors 15, these clearances making it possible to ensure that the footings 17 of the sectors 15 press firmly against the bottom 7a of the drop center 7.

In this first embodiment, it is clear that the rim 1 must be of sufficient thickness to make it possible to provide the blind holes 26 therein. A solution consisting in piercing the rim through would require precautions to be taken to ensure that the rim 1 is airtight, as will readily be understood.

In general, the screws 22 are of greater or smaller size and the number and tightening torque thereof can also be varied as a function in particular of the maximum speed of the motor vehicle.

Figure 2:
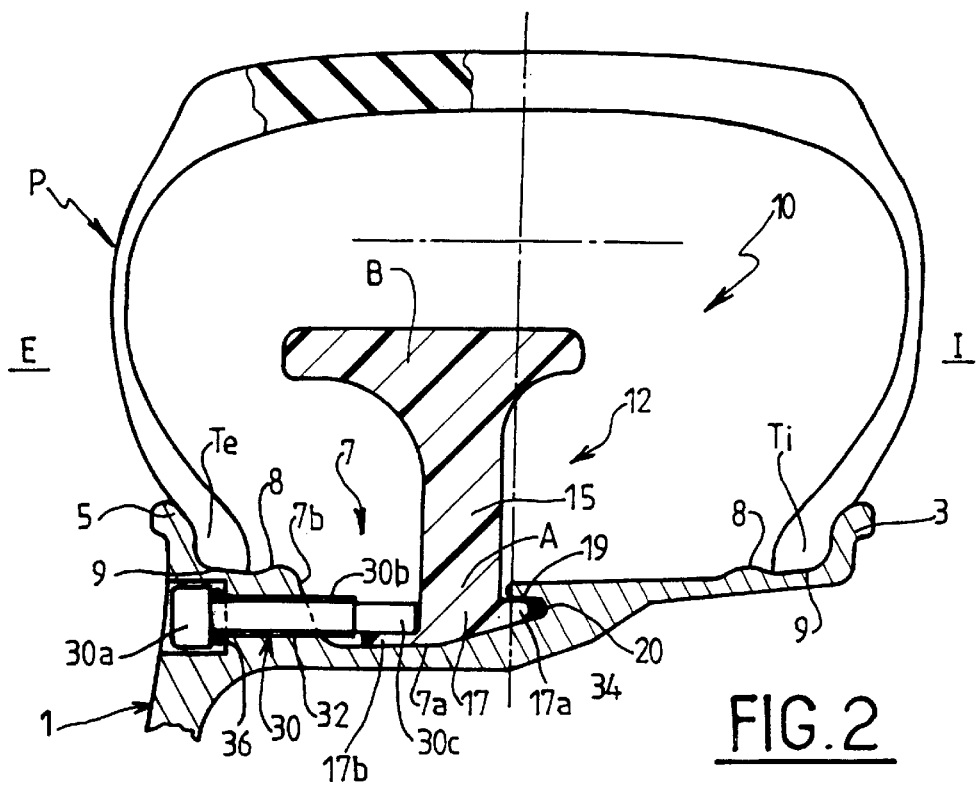
FIG. 2 is a half-view in axial section of a second embodiment of a runflat device of the invention.

In a second embodiment which is shown in FIG. 2, the ring 12 presents the same general characteristics as the ring shown in FIG. 1, since the sectors 15 are likewise fixed to the rim 1 by means of screws, however these screws 30 are mounted differently and they do not penetrate into the sectors of the ring.

The rim 1 has threaded holes 32 passing through it, which holes are machined from the outer face of the rim 1 so as to open out into the drop center 7 through its outer side wall 7b.

The tire P and the sectors 15 of the ring 12 are mounted in substantially the same manner as that described for the first embodiment, but with one major difference.

Before the sectors 15 are put into place around the rim 1, an O-ring 34, e.g. of rubber, is put in the lateral groove 20 of the drop center 7.

Advantageously, the screws 30 used are dog-point screws, each presenting an enlarged head 30a extended by a shank 30b which is threaded over a fraction of its length only, its non-threaded end forming a dog point 30c for bearing against the outer lateral flange 17b without damaging it.

Each screw 30 is engaged in a hole 32 in the rim 1 and it is tightened so as to obtain a predetermined torque. The end of its dog point 30c then bears against the outer face of a beam portion of a sector 15 at a level that is situated immediately above the outer lateral flange 17b of a footing 17 while also compressing the O-ring 34 in the bottom of the lateral groove 20 of the drop center 7. The head 30a of each screw 30 bears against the rim 1, compressing an O-ring 36 for providing airtightness. In order to ensure that the O-ring 36 is effective, the length of screw 30 is predetermined, given that the O-ring 34 placed in the lateral groove 20 of the drop center 7 is there to accommodate manufacturing tolerances.

As in the first embodiment, the sectors 15 of the ring 12 are locked in position both laterally and vertically. Lateral locking is provided by means of the screws 30 and the O-ring 34, while vertical locking is provided by means of the screws 30 and by means of the lateral groove 20 in the drop center 7.

It should be observed that once the sectors 15 have been fixed to the rim 1, the tongue 19 of the rim 1 which defines the lateral groove 20 in the drop center 7 is not in contact with the sectors 15. The presence of clearance allows the O-rings 34 and 36 to be compressed freely.

Figure 3:
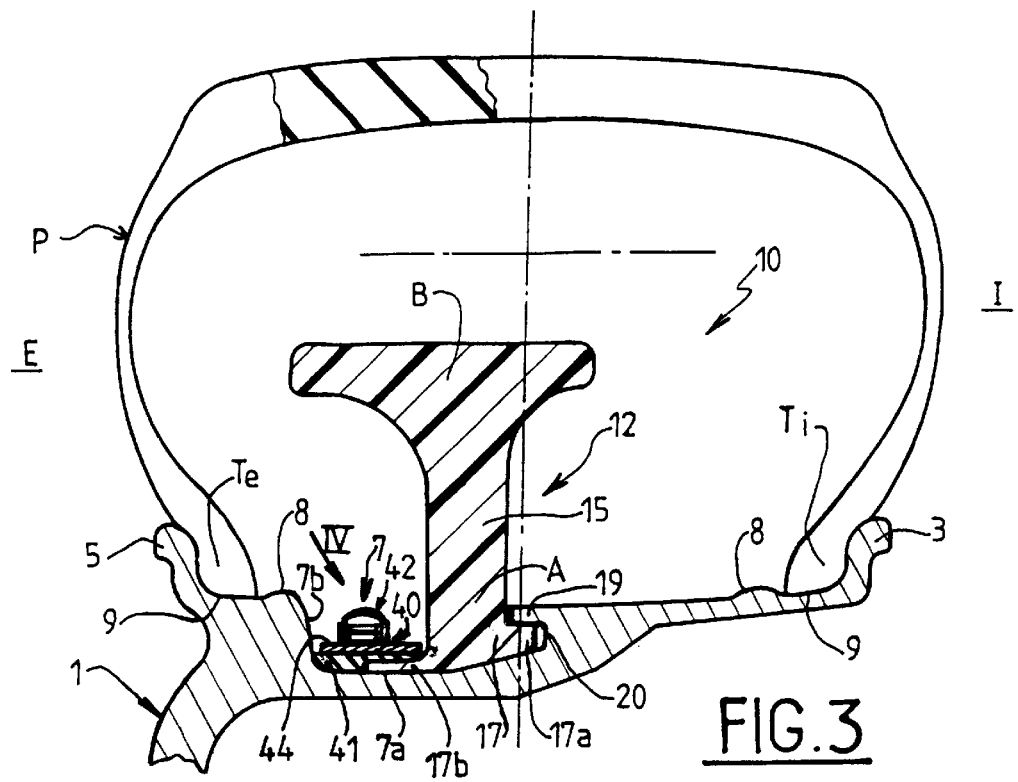
FIG. 3 is a half-view in axial section of a third embodiment of a runflat device of the invention.

In a third embodiment shown in FIG. 3, the sectors 15 of the ring 12 are not fixed to the rim 1 by means of screws, but by means of a clamping belt 40 which is fitted around the outer lateral flanges 17b of the footings 17 of the sectors 15.

Figure 4A:
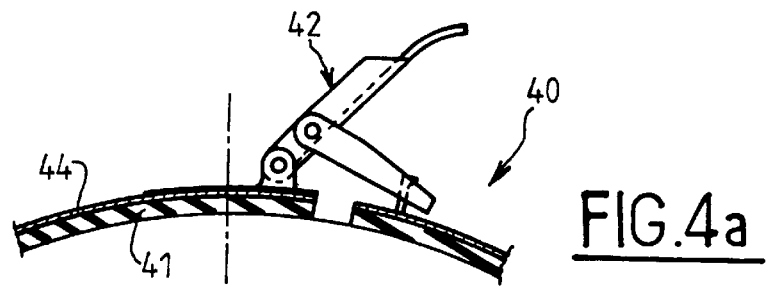
FIGS. 4a and 4b are fragmentary side views of a detail marked by arrow IV in FIG. 3.
Figure 4B:
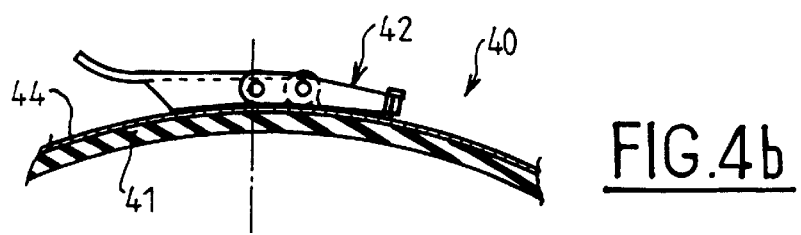

The clamping belt 40 is made of a flexible material such as rubber for its radially inner portion 41 and a metal tape 44 for its radially outer portion. Its two free ends are connected to each other by means of a toggle-action locking device 42 of conventional kind shown in FIG. 4a in an intermediate position and in FIG. 4b in a locked position.

Advantageously, the metal tape 44 is bonded to the rubber 41 by cold adhesive or hot adhesive, and its width is less than that of the rubber portion so as to ensure that it does not come into contact either with the sectors 15 of the ring 12 or with the outer side wall 7b of the drop center 7. The toggle-action locking device 42 is spot-welded to the metal tape 44, for example.

The width of the clamping belt 40 is such that its two peripheral rubber margins come into contact respectively with the outer wall 7b of the drop center 7 and with the outer faces of the sectors 15 of the ring 12, by overlying the footings 17. Furthermore, the width of the drop center 7 is greater than that in the preceding embodiments so as to leave room for receiving the clamping belt 40. During assembly, it can be observed that the inner lateral flanges 17a of the footings 17 of the sectors 15 are pushed into the lateral groove 20 of the drop center 7 so that the tongue 19 of the rim 1 which defines the groove 20 comes into contact with the inner faces of the sectors 15 of the ring 12.

As in the preceding embodiments, the sectors 15 of the ring 12 are locked in position both laterally and vertically. Lateral locking is provided by contacts between the ring 12 and the tongue 19 of the rim and with the outer wall 7b of the drop center 7, and vertical locking is provided by the belt 40 and the lateral groove 20.

In general, the projection of the ring 12 is intended to limit lateral movement of the tire P, so as to retain good drive by keeping the bead $T_e$ of the tire in its well 9, and to provide better road holding for the vehicle when running on a flat or with the tire P underinflated.

In the embodiments of FIGS. 1 to 3, the projection on the ring 12 extends outwards towards the outer side E so as to come substantially vertically in register with the outer peripheral hump 8 of the rim 1.

What is claimed is:

1. A runflat device for a motor vehicle, the device comprising a ring for mounting inside a tire on a one-piece non-standard wheel rim that presents a drop center, an inner flange and an outer flange, said ring being made as at least two sectors each having a radially inner zone and a radially outer zone, wherein the sectors of the ring are independent of one another, and each sector is fixed to the rim via its radially inner zone the radially inner zone of each sector of the ring being terminated by a circularly actuate footing designed to bear against the bottom of the drop center, said footing presenting an inner lateral flange and an outer lateral flange, the inner flange being received in a lateral groove in the drop center while the outer flange matches the profile of the drop center and cooperates with the means for fixing the sector of the ring on the rim.

2. A runflat device according to claim 1, wherein each sector of the ring is fixed to the wheel rim by means of screws.

3. A runflat device according to claim 2, wherein the fixing screws pass through the outer flange of the footing of each sector of the ring and penetrate into tapped blind holes formed in the thickness of the wheel rim from the bottom of the drop center.

4. A runflat device according to claim 3, wherein the tapped blind holes are machined obliquely in the thickness of the rim to facilitate screw-fitting operations.

5. A runflat device according to claim 2, wherein each sector of the ring is locked laterally by means of the fixing screws and is locked vertically by means of the fixing screws and by means of the groove of the drop center.

6. A runflat device according to claim 2, wherein the fixing screws pass through tapped holes machined laterally through the rim and opening out into the drop center so as to bear in clamped manner against the outer face of a beam portion of each sector of the ring.

7. A runflat device according to claim 6, wherein the fixing screws are dog-point screws.

8. A runflat device according to claim 6, wherein each fixing screw has an enlarged head which bears against the rim via a sealing ring.

9. A runflat device according to claim 6, wherein the inner flanges of the footings of the sectors of the ring bear against an O-ring placed in the lateral groove of the drop center.

10. A runflat device according to claim 9, wherein each sector of the ring is locked laterally by the fixing screws and the O-ring, and is locked vertically by means of the fixing screws and by means of the lateral groove.

11. A runflat device according to claim 1, wherein the means for fixing the sectors of the ring on the rim are constituted by a clamping belt.

12. A runflat device according to claim 12, wherein the clamping belt is mounted in the drop center to surround the outer flanges of the sectors of the ring.

13. A runflat device according to claim 11, wherein the clamping belt is made of rubber for its radially inner portion, and is covered in a metal tape stuck thereto and of width that is narrower than that of the rubber portion of the clamping belt.

14. A runflat device according to claim 11, wherein the clamping belt has two free ends which are united with each other by means of a toggle-action locking device.

* * * * *

UNITED STATES PATENT AND TRADEMARK OFFICE
CERTIFICATE OF CORRECTION

PATENT NO. : 6,505,660 B2
DATED : January 14, 2003
INVENTOR(S) : Heuze et al.

It is certified that error appears in the above-identified patent and that said Letters Patent is hereby corrected as shown below:

<u>Column 6,</u>
Line 2, "actuate" should read -- arcuate --;
Line 45, "claim 12" should read -- claim 11 --.

Signed and Sealed this

Seventeenth Day of June, 2003

JAMES E. ROGAN
*Director of the United States Patent and Trademark Office*